(12) United States Patent
Olszak

(10) Patent No.: US 11,278,019 B2
(45) Date of Patent: Mar. 22, 2022

(54) CRAWLING INSECT DETECTION AND PROTECTION SYSTEM

(71) Applicant: Walter Olszak, Flint, MI (US)

(72) Inventor: Walter Olszak, Flint, MI (US)

( * ) Notice: Subject to any disclaimer, the term of this patent is extended or adjusted under 35 U.S.C. 154(b) by 157 days.

(21) Appl. No.: 16/696,200

(22) Filed: Nov. 26, 2019

(65) Prior Publication Data
US 2020/0267963 A1    Aug. 27, 2020

Related U.S. Application Data

(60) Provisional application No. 62/809,577, filed on Feb. 23, 2019.

(51) Int. Cl.
*A01M 1/00* (2006.01)
*A01M 1/10* (2006.01)
*A01M 1/02* (2006.01)
*A01M 1/14* (2006.01)
*A01M 1/20* (2006.01)

(52) U.S. Cl.
CPC ............ *A01M 1/103* (2013.01); *A01M 1/023* (2013.01); *A01M 1/026* (2013.01); *A01M 1/14* (2013.01); *A01M 1/2011* (2013.01)

(58) Field of Classification Search
CPC ......... A01M 1/103; A01M 1/026; A01M 1/10
See application file for complete search history.

(56) References Cited

U.S. PATENT DOCUMENTS

| | | | |
|---|---|---|---|
| 5,926,999 A * | 7/1999 | Vernon | A01M 1/10 43/121 |
| 6,164,009 A | 12/2000 | Clarke | |
| 2011/0047860 A1 | 3/2011 | Black et al. | |
| 2014/0020280 A1* | 1/2014 | Cullen | A01M 1/103 43/114 |
| 2018/0168139 A1* | 7/2018 | Koehler | A01M 1/10 |

* cited by examiner

*Primary Examiner* — Joshua J Michener
*Assistant Examiner* — Henry Hooper Mudd
(74) *Attorney, Agent, or Firm* — Carrier Blackman & Associates, P.C.; Joseph P. Carrier; Anne G. Sabourin

(57) ABSTRACT

A crawling insect detection and protection system includes a curved member for attachment to a surface. The curved member has a coarse textured outer surface and a smooth interior surface, the interior surface includes a grooved upper lip located at a top portion of the curved member and a smooth lower lip located at a bottom portion of the curved member. The width of the grooved upper lip is recessed from the bottom lip to allow a crawling insect to fall into the lower lip portion. The system includes an attachment means which may be an adhesive fastener and/or a mechanical fastener for affixing a mounting surface of the flexible curved member to an attachment surface.

12 Claims, 6 Drawing Sheets

CRAWLING INSECT DETECTION AND PROTECTION SYSTEM

CROSS-REFERENCE TO RELATED APPLICATIONS

This application claims priority to U.S. Provisional Application No. 62/809,577, filed on Feb. 23, 2019, which is hereby incorporated by reference.

BACKGROUND OF THE INVENTION

Various mechanical, chemical and heat treatments have been devised to disable or eliminate crawling insects such as bedbugs which are a nuisance pest and cause serious infestations in homes, hospitals, nursing homes, schools and public common areas. These treatments are often ineffective for controlling infestations of the insects.

The present invention is directed to an insect detection and protection system which prevents such insects from reaching surfaces with which humans come into contact. The system is used as a pest control system to eliminate crawling insects once they are detected. The system can be used in homes, offices, hospitals, nursing homes, public spaces, public transportation, and in any location where infestation is a problem.

SUMMARY OF THE INVENTION

A crawling insect detection and protection system includes a rigid or flexible curved member for attachment to a surface of one of furniture, walls and floors or other surfaces. The curved member has an upper portion and a lower portion, and a coarse textured outer surface and a smooth interior surface. The interior surface includes a grooved upper lip located at the upper portion of the curved member and a smooth lower lip located at the lower portion of the curved member. The width of the grooved upper lip is recessed from the bottom lip to allow a crawling insect to fall into the lower lip portion. The system includes an attachment means which is an adhesive fastener such as two sided tape, applied to a mounting surface of the curved member for affixing the curved member mounting surface to an attachment surface.

The detection, monitoring and protection system provides a mechanical barrier between the floor and protected surface and provides an attractive climbing surface for insects to climb into the detection and protection system and provides an effective insect entrapment means.

DETAILED DESCRIPTION OF THE INVENTION

A crawling insect detection, monitoring and protection system is provided for use by the general public or professional pest control technicians as a mechanism for detecting the presence of a suspected crawling insect infestation and to prevent insects from reaching unprotected furniture and other areas. The system can be used to prevent infestation, or re-infestation after control measures have been taken. The system is effective for detecting crawling insects on surfaces and protecting surfaces from infestation by such insects. The system is particularly useful for detecting, monitoring and capturing bedbugs. The system may be configured to fit many surfaces in any environment and is reusable.

Figure 1:
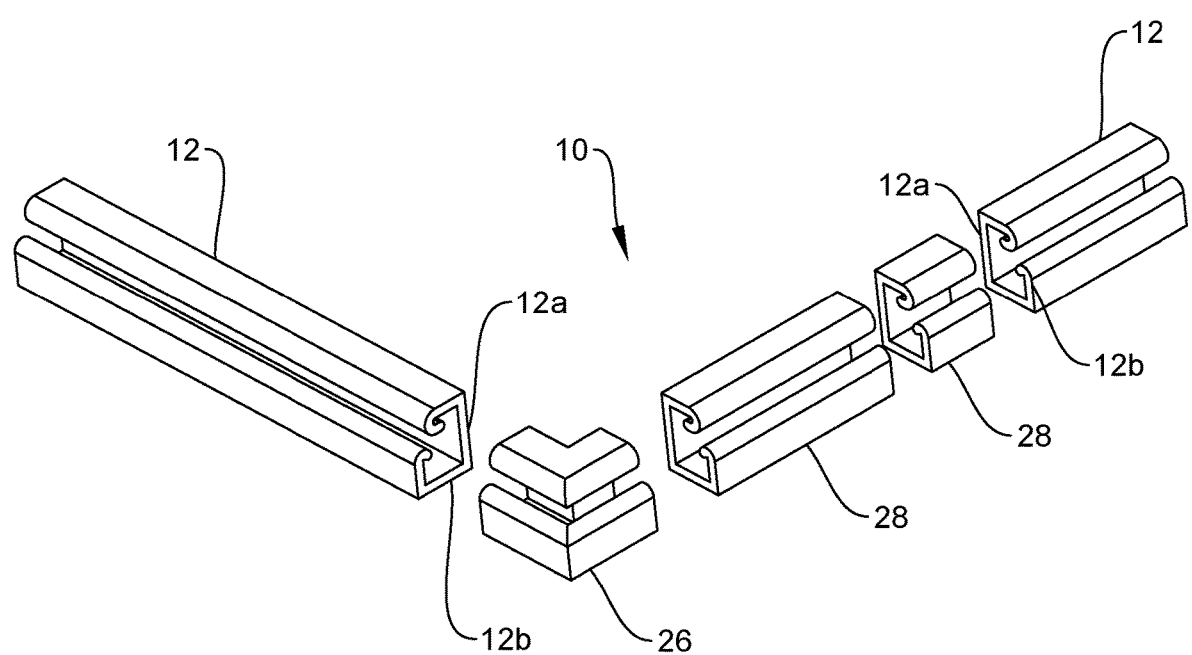
FIG. 1 is an exploded view of the system.

The insect detection, monitoring, and protection system 10 as shown in FIG. 1, includes a flexible or rigid curved member structure 12 for attachment to a surface such as furniture, walls, floors, seating, wheelchairs, benches, public transportation seats, or other surfaces. The curved member structure is described in further detail as follows. As shown in FIG. 1, the curved member structure is configured to include a top portion 12(*a*) and a bottom portion 12(*b*). The curved member structure also may include a corner connector 26 and one or more linear connectors 28 of varying lengths, matching the configuration of curved member structure 12.

The curved member structure includes a curved top portion 12(*a*), a curved bottom portion 12(*b*) and a mounting portion (24) located between and joined to the top portion and bottom portion. The top portion includes a curved grooved upper lip (18), and the bottom portion includes a curved lower lip (20), the curved upper lip extending down and inward on an outer edge (19) of the top portion, and the curved lower lip extending up and inward on an outer edge (21) of the bottom portion.

Figure 2A:
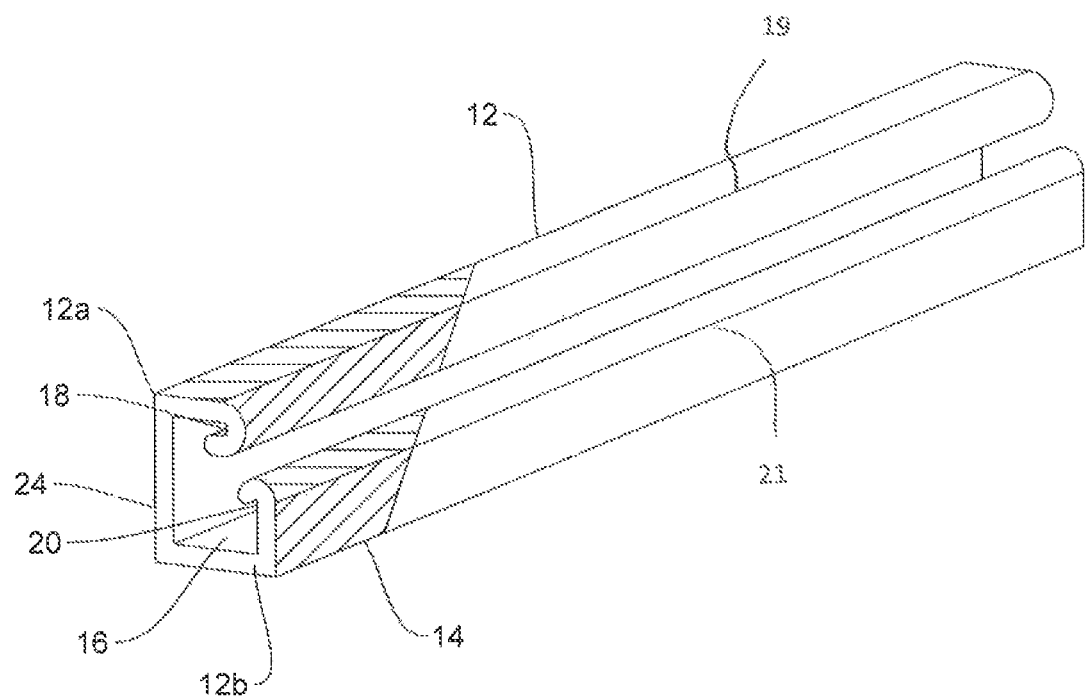
FIG. 2A is a front view of a curved member.
Figure 2B:
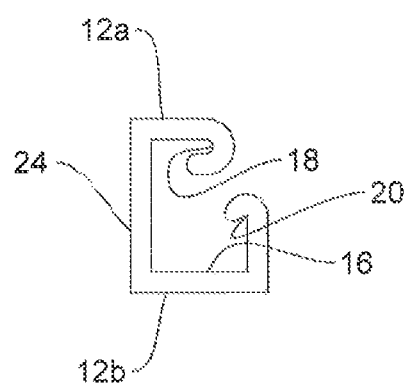
FIG. 2B is an end view of the curved member.

As shown in FIGS. 2A and 2B, the curved member structure 12 has a coarse or textured outer surface 14 and a smooth interior surface 16. To provide traction, the average surface roughness is at least 2.5 micrometers in depth. Average surface roughness is the arithmetic average height of roughness irregularities measured from a mean line within an evaluation length. The average surface roughness of a material can be measured using a Pocket Surf® portable surface roughness gage available from Mahr Federal Inc. The interior surface includes a grooved upper lip 18 located at the top portion 12(*a*) of the curved member for secure footing of the insect, allowing the insect to attach to the grooved lip and to crawl into the curved member. The groove is at least 2.5 micrometers, preferably at least 3.0 micrometers in depth. A lower lip 20 having a smooth interior surface is located above a bottom portion 12(*b*) of the curved member. The smooth surface of the lower lip has an average surface roughness of 2.3 micrometers or less. The grooved upper lip 18 is recessed or offset from the lower lip 20, to allow a crawling insect to move into the smooth interior surface 16 and to fall into the bottom portion 12*b*, where the smooth interior surface of the lower lip portion 20 traps the insect and prevents migration to other surfaces. The curved member structure 12 may be linear or curved in shape, or may be configured in any length, and may be configured to fit any desired surface shape.

As shown in FIGS. 2A and 2B, the system 12 also includes an attachment surface 24. The system also includes an attachment means (not shown) which is an adhesive fastener and/or a mechanical fastener, such as two sided tape, or other suitable adhesive, nails, screws, tacks, or other fastener, for attaching a mounting surface 24 of the curved member to an attachment surface such as furniture, walls, floors, or other surface. The flexible curved member is comprised of a material such as vinyl or flexible thermoplastic elastomer with a Shore hardness of from 10 to 100.

Figure 3A:
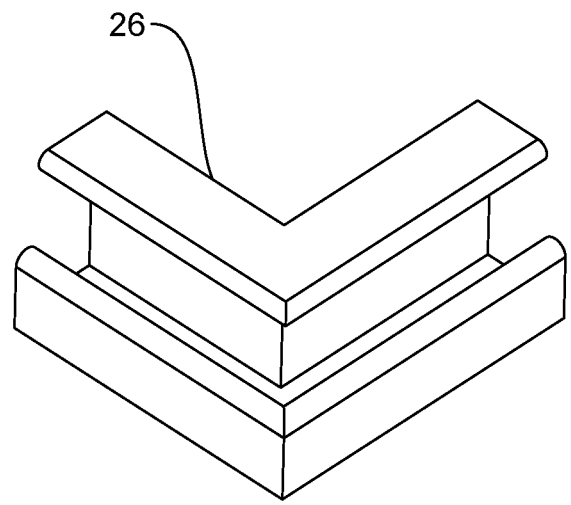
FIG. 3A is a frontal view of the angled connector.
Figure 3B:
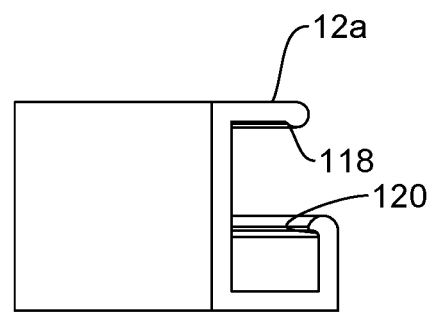
FIG. 3B is a top view of the angled connector.

Shown in FIGS. 3A-B is the corner connector 26 for connecting lengths of curved member at an angle, for example to fit a corner of furniture or between a wall and floor or two walls. The corner connector 26 also includes a top portion 112a corresponding to 12a and a bottom portion 112b, corresponding to 12b of the curved member. The interior surface of the corner connector includes a grooved upper lip 118 located at the top portion 112a of the connector, and a lower lip 120 is located at a bottom portion 112b of the corner connector. The grooved upper lip 118 is recessed or offset from the lower lip 120 of the connector.

Figure 4:
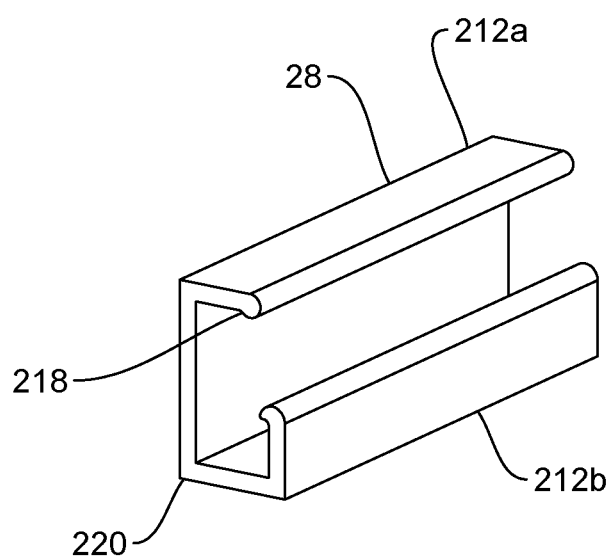
FIG. 4 is a frontal view of a linear connector.

Shown in FIGS. 1 and 4 is a linear connector 28 which joins linear portions of the curved member together includes a top portion 212a and a bottom portion 212b, corresponding to sections 12a and 12b of the curved member structure, and an upper lip portion 218 and a lower lip portion 220, corresponding to upper lip and lower lip of the curved member structure. The linear connector 28 may vary in length from the curved member and may include an attachment surface for attaching the connector to a wall, furniture, or other surface.

Figure 5A:
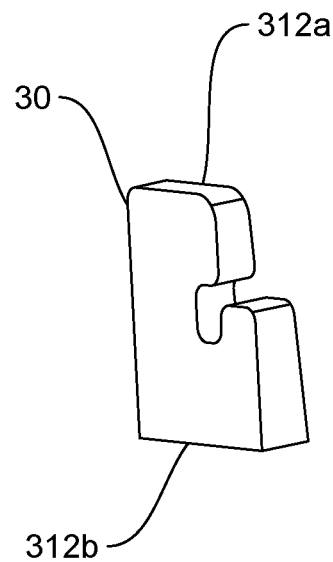
FIG. 5A is a side view of an end cap.
Figure 5B:
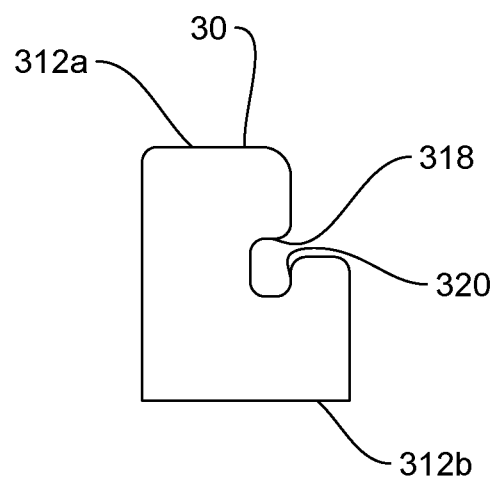
FIG. 5B is an end view of an end cap.

As shown in FIG. 5A and FIG. 5B, the system may also include an endcap portion 30 where a linear portion of curved member is used wherein the endcap 30 is applied to each end of the curved member. The connectors and endcap are preferably a rigid thermoplastic material. As shown in FIG. 5A, the endcap includes a top portion 312a, corresponding with the top portion of the curved member structure and a bottom portion 312b corresponding with the bottom portion of the curved member structure.

As shown in FIG. 5B, the endcap is configured with an upper lip portion 318 corresponding to the curved member upper lip portion 18 located at the top portion 312(a) endcap, and a smooth lower lip 320 is located at a bottom portion 312(b) of the endcap. The grooved upper lip 318 is recessed or offset from the lower lip 320.

The detection, monitoring and protection system is effective to initially detect insects such as bed bugs by capturing them in the smooth bottom portion 16 of the curved member. The system is effective for continuous monitoring for the presence of bed bugs after a surface or room has been treated for such insects as the system would capture any remaining insects. The system protects from initial infestation or re-infestation by capturing insects using the system. The insect is able to gain traction on the rough or textured outer surface of the system and crawl onto the grooved upper lip. Once the insect crawls from the grooved upper lip 18 onto the smooth interior 16 of the curved member it loses its traction and falls into the bottom portion 12b of the curved member.

The bottom portion 12b of the curved member may contain therein a component to attract, retain and/or kill the trapped insect. For example, pheromone compositions may be used to attract insects, an adhesive may be used to trap the insect, and a biocide or insecticide may be included to kill insects held in the lower lip portion. Any combination of these components may be used in the smooth interior or inside portion of the curved member of the insect detection, monitoring and protection system.

The insect detection, monitoring and protection system may be applied to any household furniture including but not limited to sofas, chairs, beds, headboards, nightstands and tables. The system may also be used to protect wheel chairs, benches in public areas or seating on public transportation. The system may also be applied where walls intersect floors, or on any surface touching a floor.

The insect detection and protection system is utilized by providing the desired length of curved member structure 12, in the desired configuration, and applying an attachment means, which is an adhesive, two-sided adhesive or other fastening component to an attachment surface 24 of the curved member, and affixing the curved member to the desired surface. Connector portions 26, 28 such as shown in FIGS. 1, 3, and 4 comprising rigid or flexible material and configured to receive the flexible curved member portion 12 may be used to connect linear or curved segments of flexible curved member.

In one embodiment, the detection and protection system, the flexible curved member is attached to an angled application surface, such as a corner, by an angled rigid or flexible connector. A rigid or flexible connector comprising a first connector side disposed at an angle to a second connector side is provided. The connector is attached at one connector side to an end portion of the curved member. A separate segment of curved member is attached to the second connector side to position the flexible curved member segments at an angle to each other. The segments are then applied to the angled surface, such as a corner. Alternatively, the flexible curved member may be folded around a corner.

In one embodiment, the detection and protection system includes a linear segment of curved member and end caps as shown in FIG. 5, said end caps comprising rigid plastic material formed to enclose the end portion of the linear segment are provided.

Figure 6A:
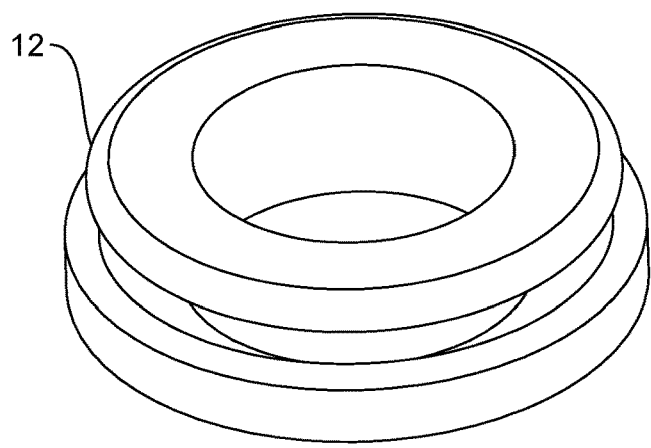
FIG. 6A is a perspective (top-plan) view of the system.
Figure 6B:
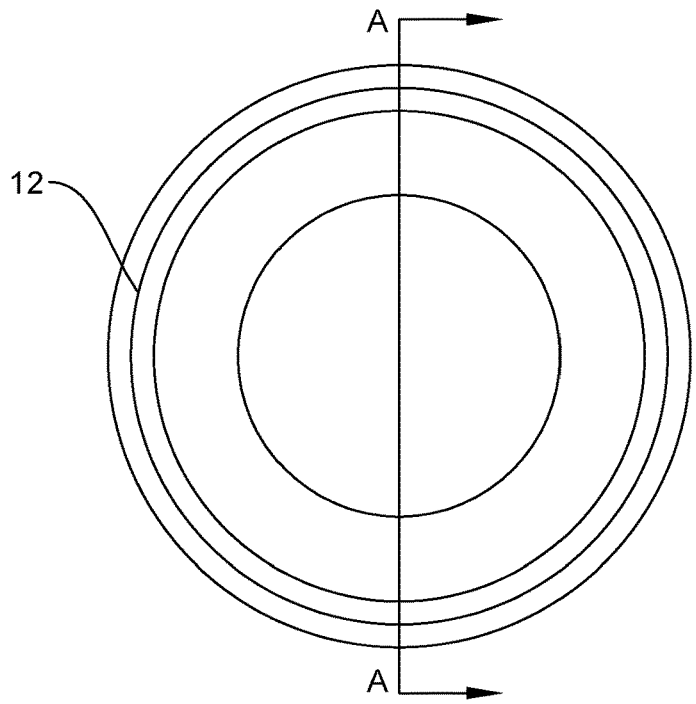
FIG. 6B is a perspective view of the system.
Figure 6C:
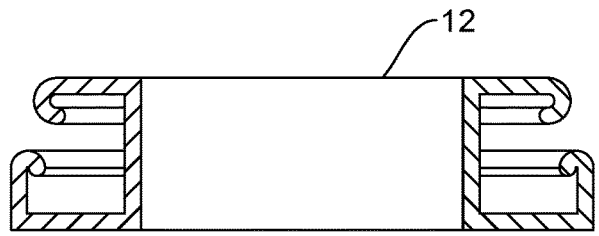
FIG. 6C is a cut away view of a curved system.

As shown in FIG. 6A, in one embodiment the detection, monitoring, and protection system includes multiple curved segments of flexible curved member 12 attached together by a curved connector component (not shown). FIG. 6B shows a perspective view of the curved flexible curved member. FIG. 6C shows a cut away view of the system using flexible curved member. The connector component may be rigid or flexible. This application is effective for covering any curved surface.

In one embodiment the insect detection and protection system is used as a bedbug protection system and includes a curved member measuring from 1 to 2 inches in height, and with an upper lip having a width of from 0.25 inches to 6 inches, and the lower lip having a width wider than, and offset from the top lip, and a depth measured from the lower lip to the bottom wall measuring from $3/8$ inches to $6\frac{1}{4}$ inches. The overall depth of the curved member from top to bottom is from 0.5 to 2.0 inches, and measures from 0.5 inches to 2 inches front to back.

In one embodiment the curved member is from 1 to 2 inches in height, and from 0.75 to 1.5 inches in depth.

The curved member is affixed to the desired surface by adhesive or mechanical means as discussed herein above. The coarse or textured outer surface of the curved member allows a bedbug to attach and crawl over the surface to the grooved upper lip which is recessed from the smooth lower lip. The bed bug is trapped when it crawls onto the smooth inner surface of the curved member and falls into the bottom portion or falls from the edge of the top lip into the bottom portion. As mentioned in other embodiments, the smooth interior portion of the curved member may include therein at least one of adhesive, biocide, insecticide, and pheromone compositions and combinations thereof to attract, trap and kill the insect.

What is claimed is:

1. A crawling insect detection and protection system comprising: a curved member for attachment to a surface of one of furniture, walls and floors, said curved member having a curved top portion, a curved bottom portion and a mounting portion located between and joined to the top portion and bottom portion, and a fastener which is of one of an adhesive fastener and a mechanical fastener for attaching the mounting portion of the curved member to an attachment surface;

wherein the top portion includes a curved upper lip, and the bottom portion includes a curved lower lip, the curved upper lip extending down and inward on an outer edge of the top portion, and the curved lower lip extending up and inward on an outer edge of the bottom portion;

wherein the mounting portion is located opposite the curved lip portions wherein each of the top portion and the curved upper lip portion have a coarse textured outer surface with an average surface roughness of at least 2.5 micrometers;

wherein an interior surface of the bottom lip portion is smooth with an average surface roughness of less than 2.3 micrometers, and includes therein at least one of adhesive, biocide, insecticide, and pheromone compositions and combinations thereof;

wherein an interior surface of the curved upper lip portion is a grooved surface;

wherein the upper lip is receded from the bottom lip to allow a crawling insect to fall from the upper portion into the lower lip portion and become trapped; and wherein the curved member is flexible and comprises a polymeric material having a Shore hardness of from 10 to 100.

2. The insect detection and protection system of claim 1, wherein the curved member is in segmented portions, and further comprising a connector component which fastens the segmented portions of the curved member.

3. The insect detection and protection system of claim 2, wherein the connector component is an angled connector including a first side member and a second side member disposed at an angle to, and integral with the first side member.

4. The insect detection and protection system of claim 3, wherein the connector first side member and second side member are disposed at an angle and a linear curved segment is connected to each side member to facilitate attachment of the curved member to a corner surface.

5. The insect detection and protection system of claim 1, further comprising at least one end cap section to close an end of a segment of the curved member.

6. The insect detection and protection system of claim 1, wherein the curved member is configured to be placed around a leg of furniture.

7. The insect detection and protection system of claim 1, wherein the curved member is configured to be attached to a wall at a location where the wall and floor intersect.

8. The insect detection and protection system of claim 1, wherein the curved member is configured to be attached to the base of a bed.

9. The insect detection and protection system of claim 1, comprising a bed bug protection system.

10. The insect detection and protection system of claim 1 wherein the polymeric material is one of vinyl and thermoplastic elastomers.

11. The insect detection and protection system of claim 5, wherein the end cap section comprises a rigid or flexible polymeric material.

12. The insect detection and protection system of claim 2, wherein the connector comprises a flexible polymeric material.

* * * * *